United States Patent [19]
Schwarzler

[11] 3,842,747
[45] Oct. 22, 1974

[54] ELECTROMAGNETIC SUSPENSION AND GUIDE SYSTEM FOR VEHICLES ADAPTED TO SWITCH TRACKS

[75] Inventor: Peter Schwarzler, Furstenfeldbruck, Germany

[73] Assignee: Krauss-Maffei Aktiengesellschaft, Munich, Germany

[22] Filed: Jan. 16, 1973

[21] Appl. No.: 324,135

[30] Foreign Application Priority Data
Jan. 17, 1972 Germany.............................. 2201984

[52] U.S. Cl............ 104/148 MS, 104/130, 335/291
[51] Int. Cl............................................. B61b 13/08
[58] Field of Search....... 104/148 MS, 130; 335/291

[56] References Cited
UNITED STATES PATENTS

| | | | |
|---|---|---|---|
| 1,589,506 | 6/1926 | Bishop | 335/291 |
| 3,628,462 | 12/1971 | Holt | 104/130 |
| 3,724,388 | 4/1973 | Karch | 104/148 MS |
| 3,750,803 | 8/1973 | Paxton | 104/148 MS |

*Primary Examiner*—M. Henson Wood, Jr.
*Assistant Examiner*—George H. Libman
*Attorney, Agent, or Firm*—Karl F. Ross; Herbert Dubno

[57] ABSTRACT

An electromagnetic guide or suspension system for a magnetically-supported vehicle which comprises symmetrically disposed electromagnetic arrangements upon the vehicle adapted to cooperate with armature rails extending into the magnetic paths of such arrangements symmetrically from opposite sides so that the vehicle may travel between a pair of outer armature rails along one track and can be switched to a second track in which the electromagnetic arrangement flanks the armature rails or vice versa.

14 Claims, 13 Drawing Figures

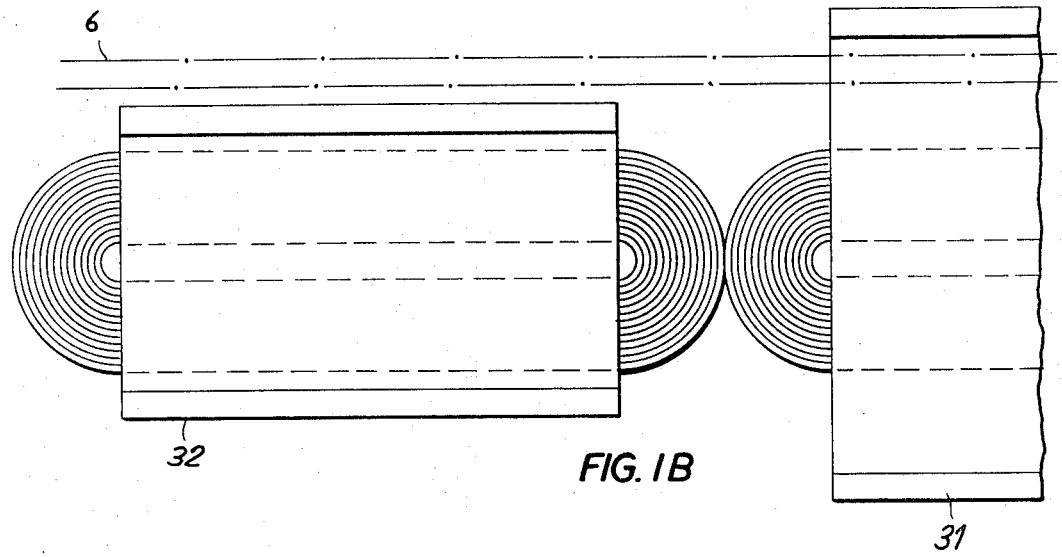
FIG. 1B
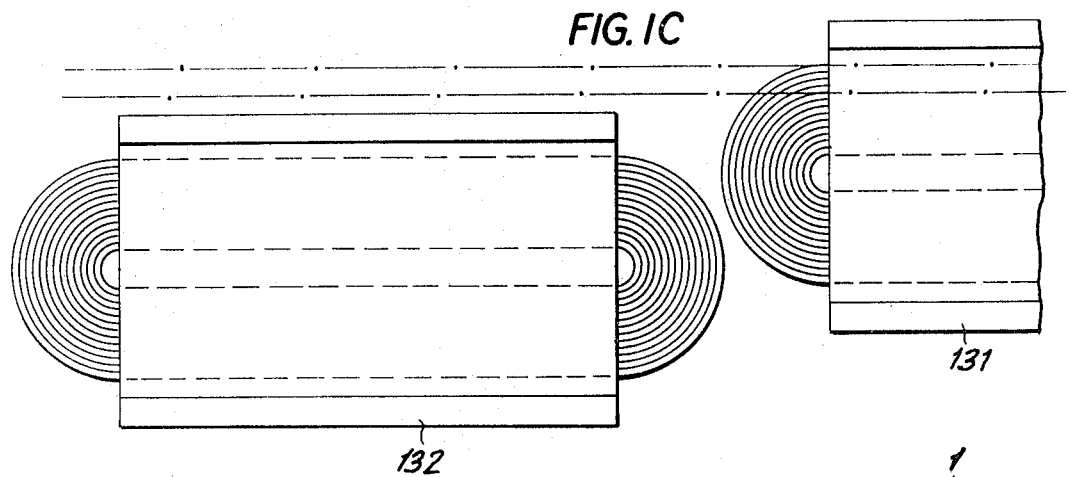
FIG. 1C
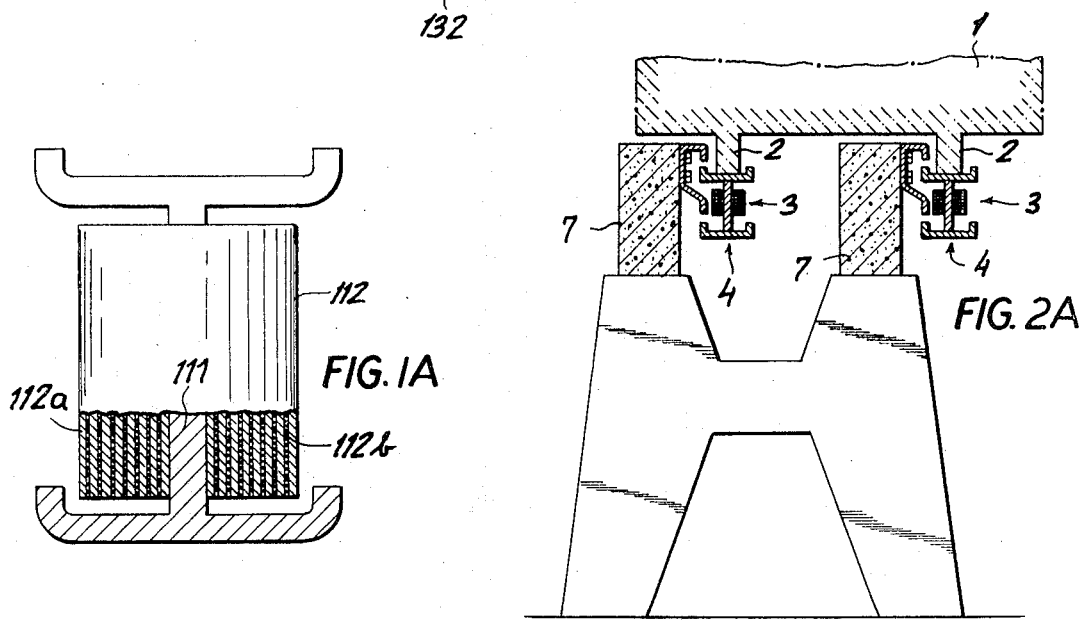
FIG. 1A
FIG. 2A

Fig. 3
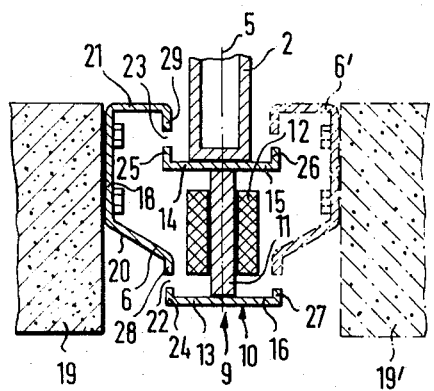
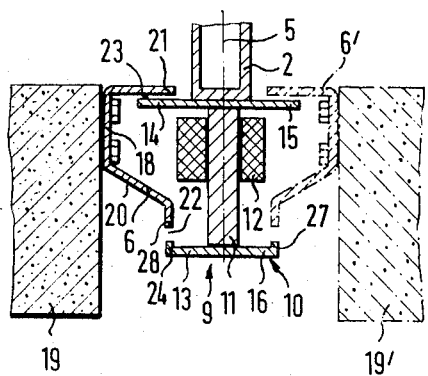
Fig. 4

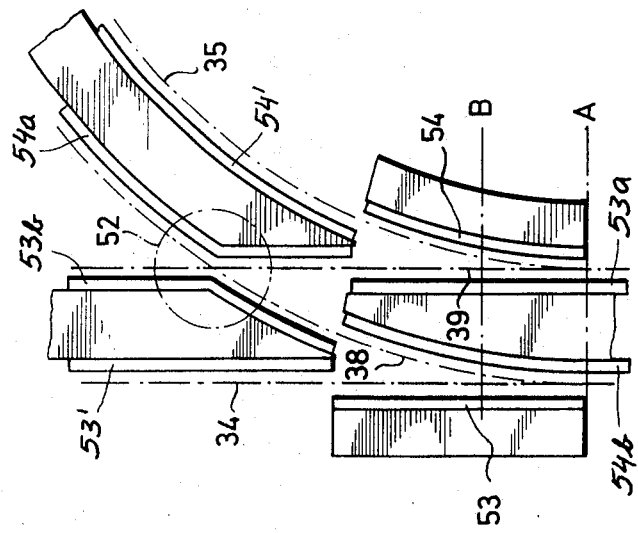
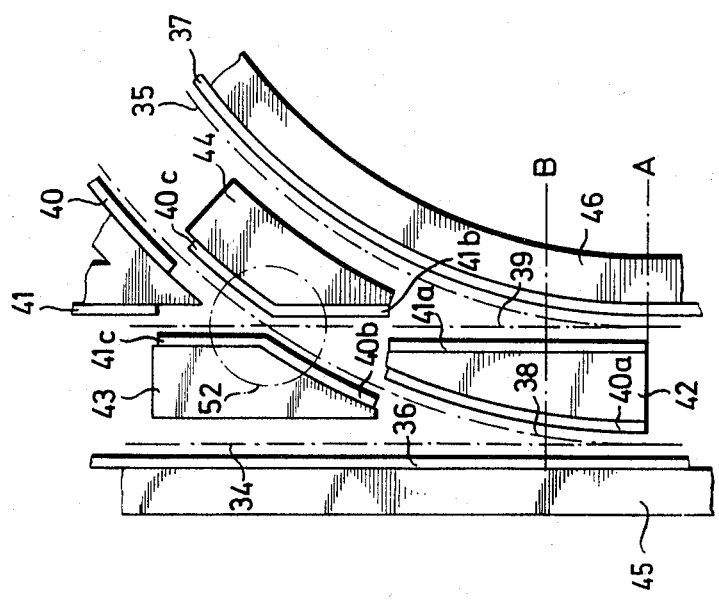

ELECTROMAGNETIC SUSPENSION AND GUIDE SYSTEM FOR VEHICLES ADAPTED TO SWITCH TRACKS

CROSS-REFERENCE TO RELATED APPLICATIONS

The present application is related to the commonly assigned copending applications:

Ser. No. 268,132, filed June 30, 1972, entitled "Electromagnetic Suspension and Guide System for Magnetically Suspended Vehicles;" Ser. No. 268,133, filed June 30, 1972, now U.S. Pat. No. 3,797,403, entitled "Electromagnetic Suspension and Drive Means;" Ser. No. 280,073, filed Aug. 11, 1972, now U.S. Pat. No. 3,780,668 entitled "Electromagnetic Suspension and/or Guide System Especially for Magnetically Suspended Vehicles;" Ser. No. 280,074, filed Aug. 11, 1972, entitled "Electromagnetic Suspension and Guide System Particularly for Vehicles;" and Ser. No. 292,638, filed Sept. 27, 1972, now U.S. Pat. No. 3,804,997 entitled "Contact System for High-Speed Electrically Operated Vehicles."

FIELD OF THE INVENTION

The present invention relates to an electromagnetic suspension and/or guide system for magnetically supported vehicles and, more particularly, to a construction of such magnetic suspension and guide means as will facilitate transfer of the vehicle between tracks, i.e., switching of the vehicle from one track to another.

BACKGROUND OF THE INVENTION

With increasing interest in high-speed vehicles for interurban, intraurban and rural-urban transport of passengers and freight, considerable attention has been directed to reducing the frictional forces which have hitherto limited high-speed rail travel. In conventional rail transport, the vehicle rides upon a road bed or track and the speed of the vehicle is limited by frictional engagement of the vehicle with the track. More recently attempts have been made to reduce the frictional forces retarding high-speed travel by suspending the vehicle electromagnetically from a track, and for this purpose, the vehicle is generally provided with an electromagnetic arrangement whose cores are juxtaposed with armature rails along the track to maintain a suspension gap spanned by the magnetic field.

A typical construction of this type makes use of a T-shaped track having a pair of armature rails disposed along the undersides of the T-crossbar and juxtaposed with rows of electromagnets on aprons of the vehicle underhanging the rails. In another construction, the T-shaped track is provided with armature rails along the upper surfaces of the crossbar and electromagnets of the vehicle are juxtaposed with these rails.

Because the track is always disposed centrally of the vehicle and generally is flanked by aprons thereof, it has been difficult, if not impossible, to effect transfer of the vehicle from one track portion to another, i.e., to effect switching of the vehicle. For example, a switching of the vehicle is possible with the earlier system mentioned above only by swinging a portion of the track from alignment with one right of way to alignment with another right of way. The switching of the vehicle without bodily movement of a portion of the track generally has not been possible with earlier magnetically suspended vehicles using a T-profile support track of the character described.

OBJECTS OF THE INVENTION

It is the principal object of the present invention to provide an improved magnetic suspension and/or guide system, especially for high-speed vehicles, which is adapted to permit transfer of the vehicle from one track system to another track system without the disadvantages of the arrangements mentioned earlier.

Another object of the invention is to facilitate switching of a magnetically suspended and/or guided vehicle without swinging of a supporting track portion.

Yet another object of the invention is to increase the versatility of magnetic suspension and/or guide systems for suspended vehicles.

SUMMARY OF THE INVENTION

These objects and others which will become apparent hereinafter are attained, in accordance with the present invention, by providing a vehicle and track system with electromagnetic suspension and/or guide means which comprises two rows of electromagnets on the vehicle, each electromagnet consisting of a core and an electromagnetic coil wound around this core, whereby at least the cores are of such configuration that substantially symmetrical and equivalent electromagnetic paths are adapted to be closed therewith by armature rails approaching the electromagnets selectively from either side.

The rows of electromagnets thus lie in a common horizontal plane, with each row of electromagnets being symmetrical about a vertical median plane of symmetry which corresponds to a symmetry plane for the core of each electromagnet which preferably is open in opposite horizontal directions to accommodate armature rails from either side.

With this arrangement each of the electromagnets can cooperate with an armature rail juxtaposed therewith from the right or left side such that the rails can be brought exclusively laterally into the magnetic path and withdrawn therefrom in the lateral direction.

According to a feature of this invention, the rows of electromagnets are so disposed that they lie on supports (pedestals) of the vehicle extending vertically therefrom and spaced apart to accommodate a central track member between them and further are adapted to be flanked by a pair of track members.

In other words, the track along which the vehicle travels may either have a central support member flanked by the rows of electromagnets and provided with outwardly facing armature rails adapted to project into the inner electromagnet path of the two rows. Alternatively the track may be of generally channel configuration with a pair of armature rails flanking the outwardly facing portions of the electromagnets and adapted to enter laterally inwardly into the magnetic paths thereof. It will be immediately apparent that switchover from one track system to another track system is readily accommodated when, at least in the transition region, the vehicle passes from a channel-like track portion to a central track portion or vice versa.

The versatility of the system is further increased by the fact that an asymmetric arrangement of the track may be provided with, for example, one armature rail (mounted upon a respective track portion) engaging one electromagnet row from the exterior and another armature rail engaging the other electromagnet rows from the interior. In this case, both armature-rail arrangements are disposed at the same side, i.e., either the right or the left, of the two rows of electromagnets and further facilitates the branching of the vehicle to the respective side.

According to another feature of the invention, each row of electromagnets, i.e., each of the two magnetic arrangements, comprises a single row of electromagnets in mirror-symmetrical configuration with respect to the vertical plane and the armature rail arrangement comprises a respective armature rail which can engage (magnetically) the electromagnets from either side. This electromagnet arrangement allows, at least to a limited extent, each row of electromagnets or each magnet arrangement to provide magnetic suspension and guidance.

It has been found to be advantageous, moreover, to constitute the electromagnetic cores as so-called double-T-profiles whose vertical shank or web carries an electromagnetic coil. The magnetic circuit generated by the coil can thus be closed over the flanges of the double-T to the left or to the right symmetrically by juxtaposition with respective armature rails.

According to a feature of the invention, the armature rail has a U-shaped profile or cross-section and is attached by its base to a vertical flank of a support beam, the beam being part of a channel or central support structure. In a channelshaped support structure, a pair of beams extend in the direction of vehicle travel, are horizontally spaced apart parallel to one another, and have vertical flanks each carrying one armature rail so that the flanges or arms of these rails project symmetrically toward one another and toward a vertical median plane of the vehicle traveling between the beams. In the central-support configuration, the beam is at least in part straddled by the vehicle and lies along the vertical median plane thereof so that opposite faces of the beam carry the armature rails and the flanges of the latter extend outwardly.

The flanges, or at least one flange, of each armature rail is provided with an edge portion which is turned preferably downwardly to lie in a vertical plane and is adapted to confront a pole piece of the core of an electromagnet carried by the vehicle. Preferably, each armature rail defines, with the horizontally projecting flanges or pole pieces of the cores of a corresponding row of electromagnets, a pair of air gaps located one above the other in a common vertical plane.

It has been found to be advantageous, especially when the system does not make use of separate guide magnets, to provide the flanges of the electromagnet cores with upwardly turned pole pieces at their free end for juxtaposition with downwardly turned pole pieces of the armature rail. In some cases it has been found to be desirable to reduce the magnetic resistance of the magnetic circuit formed by the air gaps, the core and the armature rail, by forming one of the flanges of the armature rail and the juxtaposed flange of the core with flat surfaces free from pole pieces and in overlapping relationship.

The force components tending to maintain the vehicle in a normal position during vehicle travel can be increased, even to the extend that separate guide forces in the horizontal direction from separate electromagnets can be avoided, by constructing the row of electromagnets cooperating with each armature rail with two sets of pol pieces flanking each pole piece of the armature rail. Preferably the pole pieces alternate to opposite sides of the pole piece of the armature rail. This can be achieved when the horizontal flanges of the electromagnet cores are of the same width, by horizontally staggering the electromagnets from side to side along the row. This has the advantage that the coils can be brought closer together. Alternatively, the flanges to either side of the web may be of different width and hence the long flanges may alternate with short flanges along the row of electromagnets. Still another alternative allows the electromagnets to have flange widths which alternate from a large width to a small width in succession along the row of electromagnets.

When an electromagnetic guide system separate from the suspension system is required to counteract horizontal force components, e.g., as produced by wind or by centrifugal force during turns of the vehicle, the coils thereof may be of a lesser height than the suspension electromagnets but may be wound upon double-T cores whose flanges can receive between them a pole piece of one flange of the armature rail so that the remainder of the armature rail is free from magnetic flux produced by the guide electromagnets. This system is satisfactory for symmetrical arrangements of the armature rails.

According to another feature of the invention, means is provided at least at branch junctions of the track to annul or partly annul the flux in selected rails so that, for example, when the vehicle encounters a junction at which additional rails come into play, the flux produced by the electromagnets is reduced and magnetic shock is not applied to the vehicle. The last-mentioned means may include coils wound upon one of the shanks of each armature rail and can be automatically controlled by air-gap sensors or manually controlled by the operator of the switch junction or even from the vehicle. The same field-annulling means may be used to induce the vehicle to travel along a selected track.

Where the track system is of the channel type, centralbeam auxiliary track portions are provided at the junctions to effect a transition between different paths and vice versa.

DESCRIPTION OF THE DRAWING

The above and other objects, features and advantages of the present invention will become more readily apparent from the following description, reference being made to the accompanying drawing in which:

FIG. 1A is a vertical cross-sectional view through an electromagnet according to the invention;

FIG. 1B is a diagram showing part of a row of electromagnets according to an embodiment of the invention;

FIG. 1C is a view similar to FIG. 1B but illustrating an alternative construction;

FIG. 2A is a view of still another vehicle support arrangement according to the invention;

FIG. 3 is a vertical section representing a detail of the armature rail and electromagnetic systems of FIGS. 1 and 2;

FIG. 4 is a view similar to FIG. 3 but illustrating another embodiment of the magnetic suspension system;

FIGS. 8 and 9 are plane viees showing track spur, switch or branch arrangements according to embodiments of the present invention.

SPECIFIC DESCRIPTION

Figure 2:
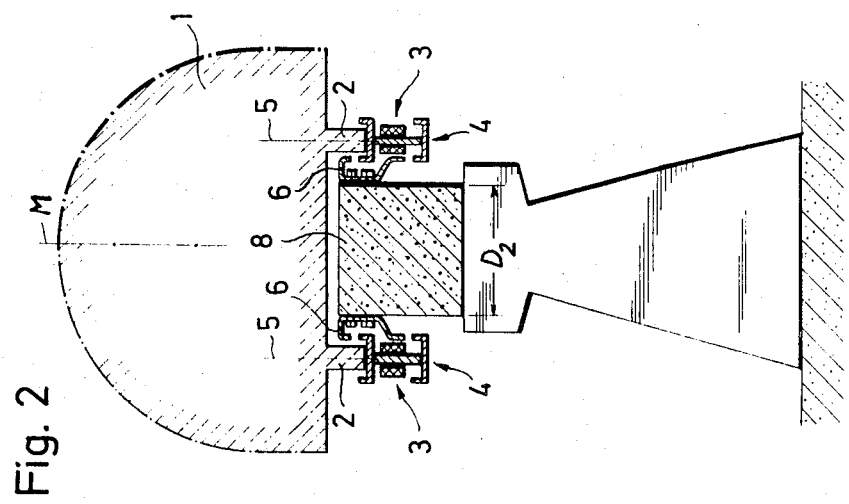
FIG. 2 is a view similar to FIG. 1 showing the central track structure to which the vehicle may be transferred from the channel structure of FIG. 1 and vice versa.
Figure 1:
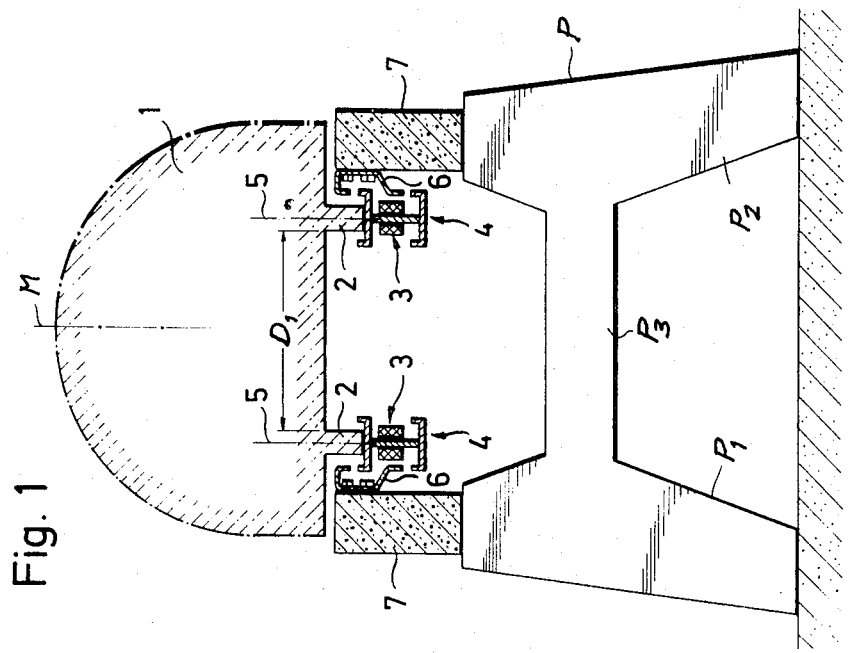
FIG. 1 is a vertical section through a track of a magnetically suspended vehicle according to the invention with the parts thereof shown diagrammatically or in outline, to illustrate the channel-type track structure employed in conjunction with the improved magnetic suspension arrangement.

FIGS. 1 and 2 show a vehicle system of the general type described in the aforementioned/copending applications and comprising a vehicle body 1, shown only in outline, having a pair of downwardly extending pedestals 2 transversely spaced by a distance D, but set inwardly from the outer edges of the vehicle. The pedestals 2 are each provided with a respective row 3 of electromagnets generally represented at 4. The electromagnets are symmetrical in the respective rows with reference to vertical median planes 5 extending the direction of vehicle travel and generally in a vertical orientation. The electromagnets 4 are so arranged and constructed as to cooperate with armature rails 6 from either side of each row of electromagnets in a mirror-symmetrical manner with respect to the planes 5.

The rails 6, of iron or other magnetic metal, are shown to be mounted on the inner faces of a pair of beams 7 defining the rod bed and having the configuration of a channel into which the electromagnet arrangements 3 depend. The beams 7 are carried by pedestals or pylons P, here shown to have an H cross-section with a pair of uprights $P^1$ and $P^2$ joined by a cross bar $P^3$, each upright carrying one of the armature rails 6.

When the vehicle is traveling along a portion of the track network formed as the channel in FIG. 1, each electromagnetic row 3 cooperates with a rail 6 flanking it. The electromagnetic field between each magnet core and the armature is effective across a pair of gaps to balance the weight of the vehicle and the load and thereby supports the vehicle out of contact with the beams 7 which are overhung by the sides of the vehicle as shown in FIG. 1.

As is also apparent from FIG. 1, the armature rails 6 have legs, arms or flanges which reach inwardly into the magnetic paths between the outwardly reaching flanges of the cores of electromagnets 4. In FIG. 2, however, the electromagnet flanges reach inwardly to cooperate with a pair of rails 6, in all respects identical to the rails of FIG. 1, but here disposed along the outwardly facing flanks of a central beam 8 whose width $D_2$ is less than the width $D_1$ mentioned earlier. Consequently, the flanges of the rail 6 of FIG. 2 reach outwardly into the magnetic paths defined by the cores of the same electromagnets 4 in a manner equivalent to the cooperation of these rails with the electromagnets in the system of FIG. 1.

The electromagnets, moreover, are preferably symmetrical with respect to a vertical median plane through the vehicle itself and through the track assembly, and the rail 6 along each section of the track, regardless of its configuration (FIG. 1 versus FIG. 2) are likewise disposed symmetrically with respect to the vertical median plane.

Of course, asymmetrical systems which use the symmetrical characteristics of the rows of electromagnets may also be provided as shown in FIG. 2A. In this case, both armature rails 6 and flanges reach to the right into the magnetic paths of the electromagnet 4. This one-sided suspension technique is less preferred although it may be used to facilitate transfer of the vehicle between tracks branching in opposite directions. It should be equally evident that the mirror-symmetrical arrangement, whereby the rails 6 reach to the left, may also be employed.

Referring again to FIGS. 1 and 2, it can be seen that the vehicle may travel selectively over channel-like tracks (FIG. 1) or central tracks (FIG. 2) with equivalent suspension characteristics using a single electromagnet arrangement because of the symmetry of the latter. At selected locations, therefore, junctions may be provided by the tracks of the two types whereat the vehicle may be guided from a channel-shaped track to a branch channel-shaped track by passing temporarily over a central track (FIG. 8), or from a central track to a branch central track by passing temporarily along a channel-shaped track (FIG. 9) or from a channel-shaped to a branch central track and vice versa.

Each of the electromagnets, as shown in greater detail in FIG. 3, comprises a longitudinally extending core 10 of double-T profile or cross-section having a vertical shank or web 11, an electromagnet coil 12 and a pair of generally horizontal flanges or cross bars 13, 16 and 14, 15. In other words each cross bar comprises a pair of flanges 13, 16 and 14, 15 so that two pairs of vertically spaced horizontal flanges 13, 14 and 15, 16 are formed to act symmetrically as the arms of a magnetic yoke and produce a magnetic flux path between the ends of these flanges. To form pole pieces, the ends of these flanges are turned upwardly to confront the pole pieces of the armature rail 6.

The armature rail 6 has a profile approximating that of a recumbent U so that its web or bit 18 forms the base and likewise in a vertical plane, being attached to the beams 7 or 8 representing the track structure and here generically identified with the reference numeral 19.

The flanges or arms of the armature rail 6 are represented at 20 and 21 and extend generally transversely to the vertical plane 5 of the row of electromagnets but parallel to the row itself. At their ends, the shanks 20 and 21 are turned downwardly at 28 and 29 to define pole pieces confronting the pole pieces of the electromagnet core 10.

The magnets, here represented generically at 9 and the armature rail 6 thus define between them a pair of air gaps 22 and 23, located one above the other and in which a vertical magnetic force field is generated when the electromagnet coil 12 is energized. The principal magnetic flux extends through the web 11, the arms 13 and 14 in FIG. 3, across the gaps 22 and 23, through the arms 20 and 21 and through the web 18 since this path has the greatest magnetic permeability. Only a slight stray magnetic flux parallel will bridge the ends of flanges 15 and 16. As a consequence, the flanges 13 and 14 are urged upwardly by the magnetic field against the downwardly acting loading force and the weight of the vehicle until an equilibrium is established at a predetermined gap width or spacing by controlling the energizing current of the coil as described in the aforementioned copending applications.

Preferably, the pole pieces 25 and 29 of electromagnet 9 and rail 6, and pole pieces 22 and 28 thereof have identical widths and are in registering alignment. When this is the case, a lateral force tends to misalign the pole faces generates a restoring magnetic force and the vehicle is guided. However, this guiding action is not always sufficient to overcome the effect of centrifugal force on turns or high wind forces so that guide magnets may be required as described in connection with FIG. 5. The electromagnets may also be provided with electrical circuitry, as described in the aforementioned copending applications, to regulate and maintain a predetermined "gap width," this term being used to define the spacing of the pole pieces from each other.

It will be seen from FIG. 3 also that the armature rail 6 may be disposed in a mirror-symmetrical position (broken lines in FIG. 3) with essentially equivalent results. In this case, the magnetic path is closed between the flanges 15 and 16 of the electromagnet and the armature rail 6' carried by the central circuit generically represented at 19$^1$. Only a small stray field will develop between flanges 13 and 14.

In FIG. 4, in which identical reference numerals have been used to represents parts identical in function to those of FIG. 3, the lower flanges 13 and 16 of the magnetic core 10 are provided with upwardly turned pole pieces 24 and 27 as previously described. The lower arm 20 of the armature rail 6, as in FIGS. 1 through 3, slopes downwardly and inwardly toward the electromagnet, preferably at an angle of about 60° to the vertical, and terminates in a downward extending pole piece 28 as previously described. However, the upper flanges 14 and 15 of the core are parallel to the upper flange 21 of the magnetic core 10 so that two parallel surfaces in overlapping relationship are provided at the upper portion of the suspension system. As a result of the relatively large pole surfaces (the surfaces in overlapping relationship), the upper air gap 23 has a lower magnetic resistance than the air gap 22 between the pole pieces 24 and 28 so that the entire resistance of the magnetic circuit is less in this system than in the system of FIG. 4.

The overlapping arrangement of the upper shanks 21 and 14, moreover, generates an increased horizontal force component which is balanced when the rail 6 are arranged symmetrically with respect to the vertical median plane M, in the system of FIG. 1 or the system of FIG. 2. While this force provides some guide effectiveness, it has been found to be desirable to provide a separate guide system nevertheless.

From FIG. 1A it will be apparent that the shank 111 of any of the electromagnets of the present system may be wound with a coil 112 of a continuous strip 112a of aluminum provided at 112b with an oxide coating to insulate the turns from one and other. The turns thus are parallel to the shank 111. An electromagnet of this type, viewed from above, is found in FIG. 1B.

Figure 5:
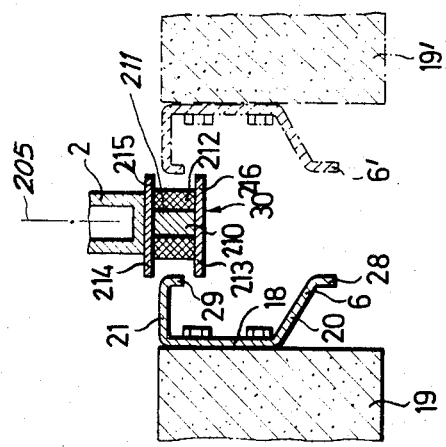
FIG. 5 is a vertical section showing a guide electromagnet arrangement which may be incorporated in any of the systems of FIGS. 1 through 4.

FIG. 5 represents a magnetic guide system which can be used with the magnetic systems of FIGS. 1 through 4. The purposes of such guide systems is to provide counteracting magnetic forces which are capable of balancing the lateral forces generated by the vehicle when it negotiates a curve or is subjected to an external pressure such as wind force. The electromagnets of the guide arrangement may, like the electromagnets of the suspension arrangement, be provided with a control support (see the aforementioned copending applications), responsive to a lateral gap to maintain this gap in spite of variations of the lateral force components applied to the vehicle. Obviously, as the lateral force upon the vehicle tending to shift it out of its normal position increases, there will be an increase in the lateral gap and the control system must then apply a countervailing force by increasing the current flow through the coil.

An important characteristic of the present invention resides in the use of the shank armature rail for both the magnetic suspension and the guide system as will be apparent from FIG. 5. Thus this Figure shows an armature rail 6 of the type described in connection with FIG. 3, i.e., provided with pole pieces 28 and 29 turned downwardly at the free ends of the shanks 20 and 21, i.e., the guide electromagnet 30 being formed with a core 210 of double-T cross-section as described for the suspension electromagnets. The guide electromagnet can be provided along the row of suspension electromagnets, i.e., between suspension electromagnets or at the end of each row, and having a web or shank 211 lying in the vertical median plane 205 of pedestal 2, and laterally extending flanges 213 through 216. The shank is wound with a coil 212. The electromagnet 30 does not have pole pieces of the type described in connection with FIG. 3 and can be of a substantially reduced height by comparison with the core 10 of the suspension electromagnets 9 previously described.

The guide electromagnets 30 are so disposed that their flanges 213 and 214, for example, cooperate with only the upper shank 21 of the armature rail 6 whereby the pole pieces 29 can be received by the flanges 213 and 214 of the electromagnet core. The web 18 and shank 20 may thus be free from any significant magnetic field as a result of energization of the coil 212. Preferably even the upper shank 21 is free from magnetic influence of coil 212 so that the flux generated by this coil passes exclusively through the pole piece 29. In this manner the guidance system is unaffected by the suspension magnetic field and vice versa.

Unlike the suspension electromagnets, which may make use of an asymmetric arrangement of the rails 6 (see, for example, FIG. 2a), the guidance system applies an attractive force from the side at which the rail is located. Hence when both rails are located to the same side of the respective row of electromagnets, the opposing magnetic forces no longer exist to maintain the vehicle in its normal position. Consequently, when an asymmetric section of track is to be used, another means for providing the lateral force balance must be employed (see FIGS. 6 and 7).

Figure 6:
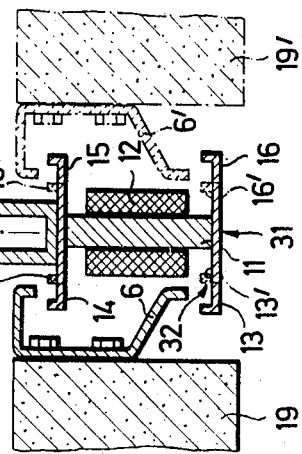
FIG. 6 is a vertical section of an electromagnetic arrangement providing lateral guide force without a special guide electromagnet, utilizing only the suspension electromagnets.

In FIG. 6, there has been shown a system whereby a symmetrical arrangement of the rails is not necessary and no special guide magnets are required.

In this system, the electromagnets may be of two types, i.e., wide-flange electromagnets 31 and narrow-flange electromagnets 32. The electromagnets 31 have cores 11 and flanges 13 through 16 as described in connection with FIG. 3, the flanges being provided with upwardly turned pole pieces. In line with these electromagnets and alternating therewith, are the narrow-flange electromagnets 32 whose pole pieces have been shown in dot dash lines in FIG. 6 and are formed on flanges represented at 13' – 16'. The flanges are dimensioned, with respect to the pole pieces of the armature rails 6 such that the electromagnet pole pieces lie alternately on one side and on the other side of the armature-rail pole pieces so that each electromagnet exerts a lateral force component upon the armature rail in a direction opposite that of the next electromagnet. The pole pieces are thus alternately offset from to one side and the other of the armature rail. By controlling the current flow to the coil of the narrow flange electromagnet and the side flange electromagnet separately and in response to laternal forces applied to the vehicle the latter can be repositioned in its normal path should a disequilibrating force have been applied. The electromagnets of each row, in this system, nevertheless are symmetrical with respect to the median plane 5.

The system described in connection with FIG. 6 is, in principle, independent of the track system to which the vehicle is applied, i.e., the track system may be symmetrical (FIGS. 1 and 2) or asymmetrical (FIG. 2A). However, problems are encountered when high speed transfer between two tracks is desired and rapid flux changes develop at the electromagnet-armature rail system.

Figure 7:
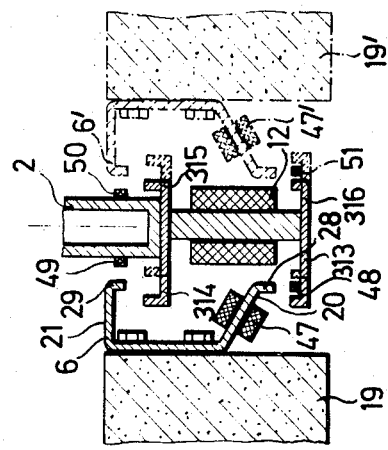
FIG. 7 is a view similar to FIG. 6 by showing another embodiment of a combined suspension and guide system.

These problems can be avoided by using the system shown in FIG. 7 wherein the electromagnets have cores whose flanges 313 and 314 are long compared with the flanges 315 and 316. The long flanges alternate to opposite sides along the row of electromagnets so that again each pole piece 28 or 29 is flanked by two sets of pole pieces. Each row, moreover, is complementary to the other so that where the one location along the length of the vehicle, a long flange portion cooperates with the armature rail on its side, the short flange portion of the corresponding magnet of the other row cooperates with it armature rail.

In FIG. 1B there has been shown an electromagnet system of the type described in FIG. 6, in plan view, the electromagnets 31 and 32 being shown from above while the armature rail is represented by the position of its pole piece at 6. In FIG. 1B there has been illustrated another modification wherein the flanges of the electromagnets 131 and 132 are of equal width, but the electromagnets are offset with respect to the median plane 5.

The asymmetric arrangement of the cores has the advantage that the coils can be brought closer together and thus is a space saving expedient. In the system of FIGS. 1C and 7, the direction and strength of the force generated by the individual magnets are independent of the position of the rail 6, i.e., whether the rail is located on the outer side or the inner side of the magnet row. Consequently, at any change in the orientation of the armature rail with respect to the vehicle, e.g., at track-switching locations, ther is no interruption in the lateral guidance or suspension characteristics.

In FIG. 8 there has been shown a switch track arrangement in which a network of the channel type is branched between a straight track and a track running to the right. The channel track structure may be of the type shown in FIG. 1. In this Figure and in FIG. 9, the location of the symmetry planes 5 of the rows of electromagnets are shown in dot dash lines.

The right-hand spur track represented at 35 is here shown to branch forming straight track 34, both the straight and the curved tracks having continuous armature rails 36 and 37 on unbroken support beams 45 and 46. The rails 36 and 37 may be identical to the rail 6 described above. At a location at the beginning of the branch, there is provided a central track portion 42 having a rail 40a corresponding to the rail 6 shown at the left in FIG. 2 and conforming to the curvature of the bend. At the other side of the central track portion 42, a rail 6 is provided as represented at 41a and corresponding to the armature rail 6 at the right hand side in FIG. 2. These tracks 40a and 41a are rendered selectively effective depending upon the direction the vehicle is to take. In the continuous or straight travel direction dot dash lines 34 and 39 describe the positions of the planes 5 (see FIG. 1) while dot dash lines 35 and 38 described the positions of the median planes when the vehicle is to be deflected onto the curved track.

At the switchover location, the straight track is formed with rail 41 corresponding to the right hand rail 6 of the FIG. 1 while, beyond the switch point of the branch, rail 40 is provided to correspond to the rail 6 at the left hand side in FIG. 1.

When the vehicle having the suspension system and guide arrangement of FIG. 7 reaches the position represented at A (bifurcation) in FIG. 9 electromagnets of rows 3 encounter all four rails 36, 37, 40a and 41a and, if no regulating action is taken, there is practically a doubling of the vertical and horizontal force components applied to the vehicle. Similar doubling occurs at the cross-over region B. To avoid this, the rails 36, 40a and 37 are provided with coils 47, 47' (FIG. 7) in the branching region and energized to annul the magnetic field generated in these portions of the armature rails as may be required to maintain constant suspension and guide forces on the vehicle. The coils are energized, of course, so as to prevent loss of suspension and guide force and also can be employed to impart a preferred direction to the vehicle. It has been found to be advantageous to provide the field-annulling coils on the lower shank 20 of the armature. The armature rails are provided also with spacing sensors 48 through 51 (FIG. 7) on the lower flanges 13 and 16 of the electromagnetic coil and on the support 49 and 50 respectively to enable control of the suspension and guide force in this region. I also may provide means for rendering the sensor selectively effective depending upon whether the vehicle is in a region in which the rails overlap (as in the region between locations A and B) or are non-overlapping. The field-annulling coils may also be provided in the region indicated by the broken line circle 52 at which rails 40b, 40c, 41b and 41c overlap.

To maintain the vehicle along the straight track, the field in rail 37 and 40a may be annulled entirely as the vehicle passes location B and the field in rail 41, and 41b and 40b maintained. On the other hand, when it is desired to switch the vehicle onto the branch track, rails 37, 40a, 41b and 40 are maintained in an effective state while the fields in the remaining rails are annulled.

In FIG. 9 a system is shown in which the vehicle is branches from one central track to another or caused to pass along the junction on a central track. In this embodiment, rail sections 54 and 54', 54a and 54b are rendered effective while the fields in rail portions 53 and 53a are annulled to induce the vehicle to turn. When the vehicle, is to travel on the straight path, rail portions 53, 53' and 53a and 53b and 54a are rendered effective while the fields in rail portions 53 and 53a are annulled to induce the vehicle to turn. When the vehicle, is to travel on the straight path, rail portions 53, 53' and 53a and 53b and 54a are rendered effective while rail portions 54, 54' and 54b are energized to annul the flux through the armature rails induced by the electromagnets.

We claim:

1. In a suspended-vehicle system comprising a track and a vehicle adapted to travel along said track, the improvement which comprises:

at least two rows of electromagnets extending in the direction of vehicle travel and mounted on said vehicle in spaced-apart relationship; and armature rails cooperating with the electromagnets of said rows and mounted on said track for magnetically supporting said vehicle, said armature rails and said electromagnets being constructed and arranged so as to close magnetic paths between each electromagnet and the respective rail on either side of each of said rows, each of said rows of electromagnets including a plurality of electromagnets each having a core and a coil wound on said core, said cores being symmetrical about respective vertical planes and having flanges extending therefrom in opposite directions for closing magnetic paths with armature rails disposed in mirror-symmetrical relationship with reference to the respective plane, each of said cores being of double-T profile and including a vertical web and upper and lower flanges extending laterally from said web, said coil being would around said web, said armature rails being of recumbent generally U-profile, each of said rails having a base connected to a generally vertical flank of said track and a pair of flanges reaching toward the respective row of electromagnets and cooperating with the flanges thereof to form a pair of air gaps with each electromagnet, disposed one above the other.

2. The improvement defined in claim 1 wherein at least one of the flanges of each electromagnet and a confronting flange of each armature rail are formed at their free ends with pole pieces turned toward one another and defining an air gap between them.

3. The improvement defined in claim 2 wherein the other flanges of each armature rail and the respective electromagnet cores are flat and parallel and are in overlapping relationship to define air gaps of low magnetic resistance between them.

4. The improvement defined in claim 2 wherein said pole pieces are aligned and have pole faces of equal width.

5. The improvement defined in claim 2 wherein the pole pieces of some of the electromagnets of each row are laterally offset to one side of the pole piece of the respective armature rail and the pole pieces of the other electromagnets of each row are offset to the other side of the armature rail pole piece.

6. The improvement defined in claim 5 wherein the flanges of the cores of the electromagnets of each row are of equal width and alternate electromagnets are offset to opposite sides of a vertical median plane of the rows.

7. The improvement defined in claim 5 wherein the width of the flanges of the cores of some of the electromagnets is greater than the width of the flanges of other electromagnets and the webs of the electromagnetic cores of each row lie in respective vertical median planes thereof.

8. The improvement defined in claim 5 wherein some of said electromagnets have long flanges to one side of a vertical median plane of said row and short flanges to the opposite side thereof while the other electromagnets have long flanges to said other side and short flanges to said one side.

9. The improvement defined in claim 2 wherein said track has a channel-shaped construction with said rails being mounted on inner faces of the channel.

10. The improvement defined in claim 2 wherein said track has a central beam, said rolls being mounted upon opposite sides of said beam.

11. The improvement defined in claim 2 wherein said track includes a pair of divergent paths forming a junction, said rails including first and second pairs of rails running along said paths and cooperating with respective sides of the respective rows of electromagnets of said vehicle, at least one rails of each path being interrupted at said junction, and fixedly positioned auxiliary rails at said junction in regions of rail interruption for cooperating with the electromagnets of said rows along the sides thereof opposite those at which the respective interrupted rails were disposed.

12. The improvement defined in claim 11 wherein at least some of said rails in the region of said junction are provided with coils energizable to annul at least part of the flux induced therein by said electromagnets.

13. In a suspended-vehicle system comprising a track and a vehicle adapted to travel along said track, the improvement which comprises:

at least two rows of electromagnets extending in the direction of vehicle travel and mounted on said vehicle in spaced-apart relationship; and armature rails cooperating with the electromagnets of said rows and mounted on said track for magnetically supporting said vehicle, said armature rails and said electromagnets being constructed and arranged so as to close magnetic paths between each electromagnet and the respective rail on either side of each of said rows, said armature rails each having a web and two shanks extending from said web toward said vehicle, each of said rows of electromagnets having arms straddling one of the shanks of the respective armature rail, said one shank of each rail being received substantially centrally between the arms of the respective electromagnet.

14. A suspended-vehicle system comprising a track;

a vehicle adapted to travel along said track;

at least two rows of electromagnets extending in the direction of vehicle travel and mounted on said vehicle in spaced-apart relationship; and armature rails cooperating with the electromagnets of said rows and mounted on said track for magnetically supporting said vehicle, said armature rails and said electromagnets being constructed and arranged so as to close magnetic paths between each electromagnet and the respective rail on either side of each of said rows, each of said rows of electromagnets including a plurality of electromagnets each having a core of substantially double-T profile and a vertical web and a coil wound around said vertical web of said core, said cores having upper and lower flanges extending laterally from said web for closing magnetic paths with armature rails disposed in mirror-symmetrical relationship with reference to a respective symmetry plane, said armature rails being of recumbent generally U-profile, each of said rails having a base connected to a generally vertical flank of said track and a pair of flanges reaching toward the respective row of electromagnets and cooperating with the flanges thereof to form a pair of air gaps with each electromagnet, disposed one above the other.

* * * * *